2,360,335
PROCESS FOR PREPARING HYDROGEN CYANIDE
William R. Jenks, Memphis, Tenn., assignor to E. I. du Pont de Nemours and Company, Wilmington, Del., a corporation of Delaware
No Drawing. Filed Mar. 12, 1964, Ser. No. 351,532
4 Claims. (Cl. 23—151)

ABSTRACT OF THE DISCLOSURE

Platinum and platinum-rhodium wire gauze catalysts which are used in preparing hydrogen cyanide from a mixture of a hydrocarbon, ammonia and oxygen are treated with concentrated aqua regia to improve their catalytic activity.

---

The use of platinum and platinum alloys in the manufacture of hydrogen cyanide by processes such as those disclosed by Andrussow in U.S. 1,934,838 and Jenks in U.S. 3,104,948 as well as other processes is well known. A mixture of gases which includes a hydrocarbon, ammonia and an oxygen-containing gas is heated as it is passed through a reaction chamber in which the catalyst is positioned. The catalyst may be in the form of a gauze or may be coated onto a substrate.

In carrying out the aforementioned processes, it is observed that when a new catalyst is first placed in the reaction chamber it does not function at top efficiency. Activation of the catalyst is required. It is also observed that after optimum conversion of the reaction gases to hydrogen cyanide is attained efficiency tends to drop off. In most instances, this is due to the catalyst becoming poisoned by impurities which may be accidentally introduced into the system or may be present in the reaction gases. When the efficiency of the process reaches an uneconomical state, operation must be discontinued, the catalyst removed, and a new catalyst placed in the reaction chamber.

It is, therefore, an object of this invention to provide a process whereby high efficiency in conversion of reaction products to hydrogen cyanide can be attained with new platinum catalysts. Another object of this invention is to provide a process for treating used platinum catalysts to restore their efficiency. Other objects will be apparent from the detailed description which follows.

The objects of this invention are attained by treating a platinum catalyst in aqua regia. The treating conditions are not critical; however, care should be taken to avoid damage to the catalyst. The details of the process will be described as they relate to treating the catalyst in the form of a gauze.

In carrying out this process, a newly prepared catalyst, which may be made up of a number of gauzes in superimposed relationship, is immersed in an aqua regia bath. The bath may be at room temperature but for new gauzes is preferably heated. Temperatures ranging from just above the freezing point to the boiling point of the treating solution may be used. Temperatures approaching the boiling point, i.e., from about 30° to 50° C., are preferred when treating newly prepared gauzes with concentrated aqua regia; whereas temperatures from about 10° C. to 50° C. are preferred when treating catalysts that have been previously used.

The time of treatment may be varied within wide limits; however, short treatment times which are just sufficient to activate the catalyst are preferred. Prolonged exposure in aqua regia may result in an excessive amount of the catalyst being dissolved from its surface. As a general rule, the gauzes are immersed in the bath for a period from about thirty minutes to about eight hours. The optimum time can be determined for the particular form of catalyst and treating conditions which are being used. Treatment for a period sufficient to remove from about 2% but not more than 8% by weight of the catalyst surface is preferred.

The invention will be further illustrated by the following examples in which parts and percentages are by weight unless otherwise specified. The ratio of feed gases to the reactor are by volume.

Example I

A catalyst pack containing 20 platinum alloy gauzes (90% platinum, 10% rhodium) in superimposed relationship was used in a reactor to which 4.5:1.0 parts of air to natural gas and 4.5:1.0 parts of air to ammonia were introduced. After a period of one month's operation, the average conversion of $HCN:NH_3$ (on a molar basis) was found to be 63.1% and the average reactor yield of hydrogen cyanide based on the amount of ammonia consumed was found to be 78.6%.

The catalyst pack was removed from the reactor and treated in concentrated aqua regia at a temperature of about 20° C. for a period of four hours. The loss in weight of the gauze was found to be between about 5% and 8%. Analysis of the metal recovered indicated that the weight loss was in the ratio of 90:10 platinum to rhodium.

The gauze pack was replaced in the reactor and operated using the same conditions previously described for one month. The average conversion was found to have increased to 64.9% and the reactor yield showed an increase to 80.6%.

Example II

A catalyst pack similar to that described in Example I was used for several weeks. The reactant gases were fed in a ratio of 5:1 parts of air to natural gas and 5:1 parts of air to ammonia. The average conversion was found to be 65% and the reactor yield 78%.

The pack was then removed from the reactor and treated for thirty minutes in boiling, concentrated aqua regia. The pack was then reinserted in the reactor and after operation for a similar period (several weeks) of time the average conversion was found to have increased to 75% and the reactor yield to 85%.

Example III

A fresh pack containing 20 platinum-rhodium (90:10) gauzes positioned in superimposed relationship was immersed in boiling, concentrated aqua regia for twenty-five minutes. The pack was placed in a reactor to which natuarl gas, ammonia, and air were fed in a ratio of 4.5:1.0 air to gas and 4.5:1.0 air to ammonia. The pack was ignited without difficulty and an average conversion of 75% and a reactor yield of 85% were obtained.

A similar fresh pack which had not been treated with aqua regia was placed in the reactor. In order to ignite this pack, it was necessary to place a preignited gauze (a gauze which had been previously used for one-half hour) on top of the pack.

In practicing the process of this invention, other forms of platinum catalysts may be substituted for the gauzes described in the preceding examples. The catalyst must be in a supported form so that it can be treated in the aqua regia bath and removed. The catalyst composition may be selected from those which are well known in the art, i.e., including the metals of the platinum series, with platinum and platinum alloys containing up to 20% rhodium being preferred.

The treating bath may consist of concentrated aqua regia as illustrated in the examples or a dilute solution may be used with treating times extended or the temperatures slightly elevated.

The activated catalysts which result from the process of this invention may be used in processes in which the hydrocarbon is supplied by natural gas as described in the examples or with other gases which contain methane or a mixture of hydrocarbons, i.e., coke oven gas may be used.

It is indeed surprising that treating platinum catalysts by the process of this invention is effective in activating both new and contaminated gauzes. Examination of photomicrographs of new gauzes treated by this process and gauzes which have been "preignited," i.e., used only for a period of time sufficient to activate them, show similar surface characteristics as well as cataytic activity. It has previously been necessary to have at least one pre-ignited gauze in a catalyst back in order to "light off" the gases in the hydrogen cyanide process. No preignited gauze is required when using gauzes treated by the process of this invention. It can be readily seen that the process of this invention offers an attractive alternative to present practice of maintaining a supply of preignited gauzes which are obtained at the expense of interrupting the hydrogen cyanide production process.

As many widely different embodiments of this invention may be made without departing from the spirit and scope thereof, it is to be understood that this invention is not to be limited to the specific embodiments thereof except as defined in the appended claims.

I claim:

1. In a process for preparing hydrogen cyanide by heating a hydrocarbon, ammonia and oxygen in the presence of a catalyst said catalyst being in the form of a gauze consisting of platinum or a platinum-rhodium alloy containing up to about 20% rhodium, the improvement which comprises treating the catalyst by contacting the surface thereof with concentrated aqua regia at a temperature from about 10° to about 50° C.

2. The process of claim 1 wherein the catalyst gauze treated with concentrated aqua regia is activated for use in producing the hydrogen cyanide.

3. The process of claim 1 wherein the catalyst gauze treated with concentrated aqua regia has been used in-producing the hydrogen cyanide and is reactivated for further use in producing hydrogen cyanide.

4. The process of claim 1 wherein the catalyst gauze is treated for a period of time sufficient to remove from about 2% to about 8% by weight of platinum or platinum-rhodium alloy from the surface thereof.

References Cited

UNITED STATES PATENTS

| | | | |
|---|---|---|---|
| 2,006,221 | 6/1935 | Ridler | 252—413 |
| 3,060,133 | 10/1962 | Jockers et al. | 252—413 |
| 3,089,844 | 5/1963 | Thorn et al. | 252—413 |

OSCAR R. VERTIZ, *Primary Examiner.*

H. S. MILLER, *Assistant Examiner.*